(12) United States Patent
Bowes (10) Patent No.: US 10,425,297 B1
(45) Date of Patent: Sep. 24, 2019

(54) ADAPTIVE POLLING BASED UPON DEMAND

(71) Applicant: Amazon Technologies, Inc., Seattle, WA (US)

(72) Inventor: Marc Andrew Bowes, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 14/077,952

(22) Filed: Nov. 12, 2013

(51) Int. Cl.
| | | |
|---|---|---|
| G06F 15/16 | (2006.01) |
| H04L 12/24 | (2006.01) |
| G08G 5/00 | (2006.01) |
| G08C 21/00 | (2006.01) |
| H04L 12/28 | (2006.01) |

(52) U.S. Cl.
CPC .......... *H04L 41/5083* (2013.01); *G08C 21/00* (2013.01); *G08G 5/0021* (2013.01); *H04L 12/28* (2013.01)

(58) Field of Classification Search
CPC ............ G06F 17/3089; H04L 41/5083; G08G 5/0021; G08C 21/00
USPC ........................................ 709/226, 224, 233
See application file for complete search history.

(56) References Cited

U.S. PATENT DOCUMENTS

| | | | | |
|---|---|---|---|---|
| 6,212,598 B1* | 4/2001 | Jeddeloh | ............. | G06F 12/0215 365/238.5 |
| 8,315,373 B1* | 11/2012 | Flockhart | ............ | H04M 3/5234 379/265.01 |
| 8,504,680 B1* | 8/2013 | Hernacki | ................ | H04L 47/28 709/224 |
| 2005/0041652 A1* | 2/2005 | Roy | ........................ | H04L 51/22 370/381 |
| 2007/0078976 A1* | 4/2007 | Taylor | ................ | G03G 15/5075 709/224 |
| 2007/0174419 A1* | 7/2007 | O'Connell | .......... | G06F 11/0709 709/217 |
| 2008/0005119 A1* | 1/2008 | Fernandez | ........... | G06Q 10/109 |
| 2008/0301484 A1* | 12/2008 | Abe | ...................... | G06F 1/3287 713/502 |

(Continued)

FOREIGN PATENT DOCUMENTS

WO    WO-2005053281 A1 *  6/2005  ........... G06F 3/1431

OTHER PUBLICATIONS

"WebSocket", Oct. 10, 2013, downloaded from http://en.wikipedia.org/wiki/Websocket, 6 pages.

*Primary Examiner* — David R Lazaro
*Assistant Examiner* — Mariegeorges A Henry
(74) *Attorney, Agent, or Firm* — Lee & Hayes, P.C.

(57) ABSTRACT

Technologies are described herein for adaptive polling based upon demand. A data source is polled for data at a first polling frequency. A request is received for a page or other type of resource that includes the data, and the data is provided in response to the request. Subsequently, the data source is polled for the data at a second polling frequency greater than the first polling frequency. Status messages are also received indicating a status of a display of the page. The polling frequency may be adjusted based on the status messages. For example, the polling frequency may be increased if a status message indicates that a user is viewing the data. The polling frequency may be decreased if a status message indicates that the data is not being viewed or that a page or other type of resource for presenting the data has been closed.

20 Claims, 5 Drawing Sheets

(56) References Cited

U.S. PATENT DOCUMENTS

| | | | | |
|---|---|---|---|---|
| 2010/0306547 | A1* | 12/2010 | Fallows | G06F 21/305 |
| | | | | 713/178 |
| 2011/0153728 | A1* | 6/2011 | Einarsson | H04W 52/0229 |
| | | | | 709/203 |
| 2012/0072856 | A1* | 3/2012 | Park | H04L 12/5815 |
| | | | | 715/752 |
| 2012/0096073 | A1* | 4/2012 | Elwood | G06F 9/44526 |
| | | | | 709/203 |
| 2012/0158825 | A1* | 6/2012 | Ganser | G06F 17/3089 |
| | | | | 709/203 |
| 2012/0304101 | A1* | 11/2012 | Dicke | G06F 3/0483 |
| | | | | 715/776 |
| 2013/0018966 | A1* | 1/2013 | Kubovsky | G06Q 10/107 |
| | | | | 709/206 |
| 2013/0263169 | A1* | 10/2013 | Pedlow | H04N 21/472 |
| | | | | 725/16 |
| 2013/0275530 | A1* | 10/2013 | Matson | H04L 51/24 |
| | | | | 709/206 |
| 2013/0290480 | A1* | 10/2013 | Manion | H04L 67/02 |
| | | | | 709/217 |
| 2013/0346333 | A1* | 12/2013 | Hassler | G06Q 10/107 |
| | | | | 705/325 |
| 2014/0337147 | A1* | 11/2014 | DaSilva | G06Q 30/0241 |
| | | | | 705/14.73 |

* cited by examiner

ADAPTIVE POLLING BASED UPON DEMAND

BACKGROUND

Many different types of computing systems utilize polling to retrieve updated data values from a data source. In this context, polling refers to a process of repeatedly requesting data from a data source in order to obtain updated values. When utilizing polling in this manner, it can be difficult to determine an optimal frequency at which data should be requested. Frequent polling may allow updated values to be obtained from a data source very close to the time at which the values change. But, if the polling operation is computationally expensive in some way (e.g. processor, memory or network bandwidth cost), then it may be desirable to poll less frequently. A lower polling frequency might, however, result in outdated ("stale") data being presented to a user or utilized in some other manner.

On-demand polling may be utilized to address at least some of the problems described above. Utilizing on-demand polling, a request is not made to a data source for an updated data value until an actual request is received for the data. On-demand polling, however, suffers from the problem that a sudden acceleration in demand for the data might result in the performance of a large number of simultaneous polling operations. Such a large number of polling operations might render the computer systems that supply the requested data incapable of responding.

Another mechanism utilized to obtain updated data from a data source involves registering for a "callback" from a data source when data of interest changes. Polling for updated values can be avoided completely using such a callback mechanism. There are many scenarios, however, where callbacks are unavailable for use in obtaining updated data values. It is with respect to these and other considerations that the disclosure made herein is presented.

DETAILED DESCRIPTION

The following detailed description is directed to technologies for adaptive polling based upon demand. Through an implementation of the technologies disclosed herein, a polling frequency can be intelligently selected based upon demand. By intelligently selecting the polling frequency in this manner, the computational cost of polling may be minimized when there is low or no demand for the data, and responsiveness may be maximized when actual demand for the data exists. Moreover, the polling mechanisms described herein might be able to scale better than previous solutions that utilize on-demand polling by satisfying requests for data from the output of the most recent polling operation.

According to one aspect disclosed herein, a data source is polled for data at a first polling frequency. The first polling frequency may be a relatively low frequency, such as once per hour or day and may be set on a per user, per customer, per resource, or other basis. A request may be received, such as from a client device, for a resource, such as a Web page, that includes the data. The resource may then be provided to the client device in response to the request. After the resource including the data has been provided to the client device in response to the request, the data source is polled for the data at a second polling frequency that is greater than the first polling frequency. The second polling frequency might be once every minute or every five minutes, for example. The second polling frequency might also be set on a per user, per customer, per resource, or other basis.

Status messages might also be received from the client device indicating the status of the display of the resource on the client device. In one embodiment, the status messages are received from the client device by way of a two-way communications channel, such as a WebSocket connection. In other embodiments, other mechanisms may be utilized to provide the status messages. For example, and without limitation, Asynchronous JAVASCRIPT and XML ("AJAX") may be utilized to submit Representational State Transfer ("RESTful") requests including the status messages to an appropriate application programming interface ("API"). Other mechanisms might also be utilized.

The polling frequency may then be adjusted based on the received status messages. For example, the polling frequency may be increased if a status message indicates that the resource is currently being displayed, an input device is in the resource, is being viewed, or the resource has the focus (i.e., the resource is selected to receive input). The polling frequency may be decreased if a status message indicates that the resource is not currently being displayed, does not have the focus, is not being viewed, or has been closed.

A determination might also be periodically made based upon the polling as to whether the data that is being polled for has changed. If the data has changed, a message may be transmitted to the client device indicating that new data is available for display on the resource. For example, a message may be transmitted to the client device instructing the client device to reload the resource in order to obtain the new data. Alternately, the new data may be transmitted directly to the client device in the message and the display of the data can be updated by active content running in the resource. Additional details regarding the technologies briefly described above for adaptive polling based upon demand are provided below with regard to FIGS. 1-4.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
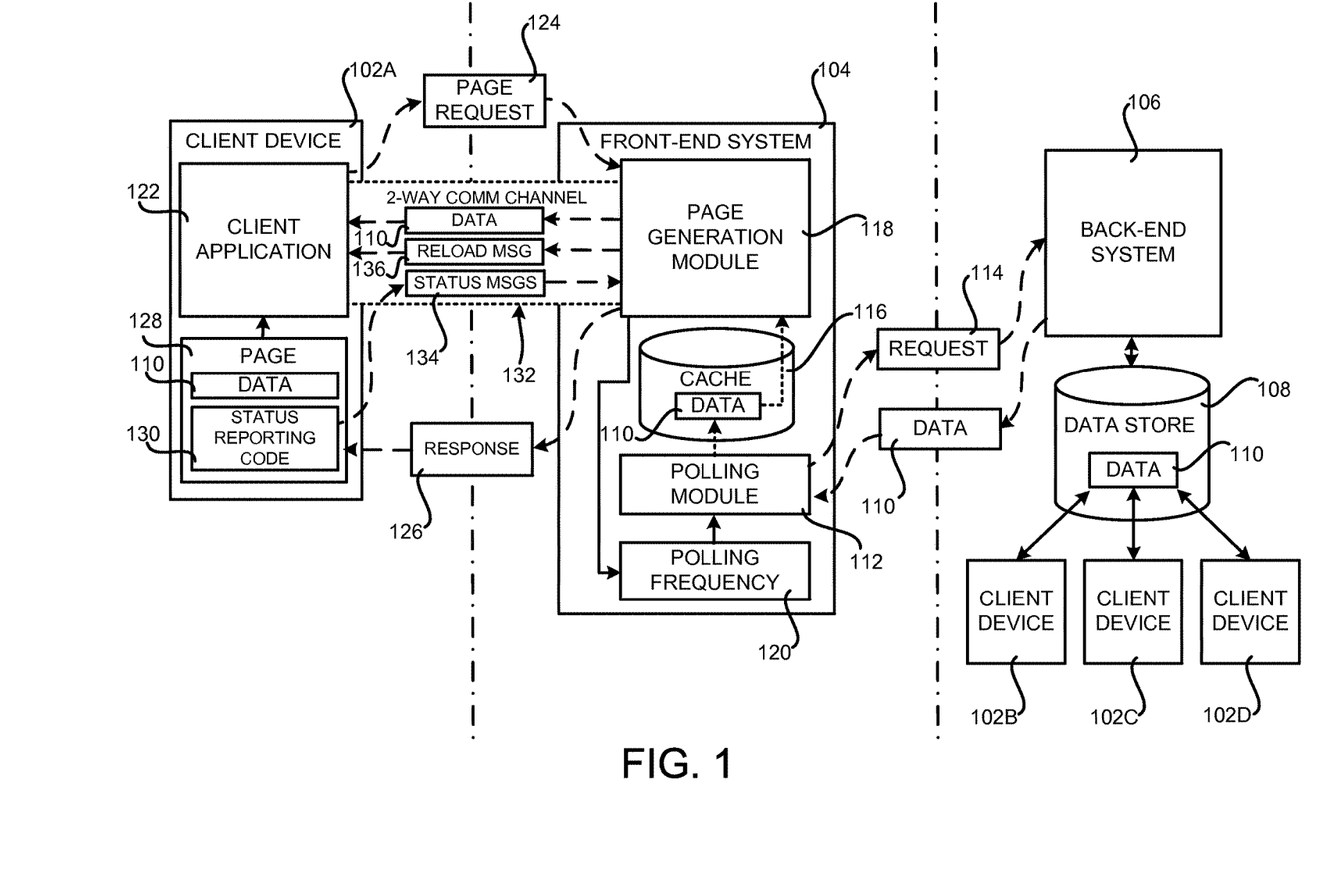
FIG. 1 is a system diagram showing aspects of a mechanism presented herein for adaptive polling based upon demand, including several software and hardware components utilized in embodiments disclosed herein.

FIG. 1 is a system diagram showing aspects of one system presented herein for adaptive polling based upon demand, including several software and hardware components utilized in various embodiments disclosed herein. The illustrative system shown in FIG. 1 includes at least one client device 102A, a front-end system 104, and a back-end system 106. The configuration and operation of each of these components is described in detail below.

The back-end system 106 includes one or more computing systems and associated software for maintaining data 110 in a data store 108. The data 110 might be virtually any type of data such as, but not limited to, data relating to electronic commerce such as the number of a product in inventory or data relating to the health of a computing system. The data 110 might change regularly, such as by modification by the client devices 102B-102D. The data 110 might also be changed by other computing systems. The data store 108 may be implemented as a database or using another suitable mechanism for storing the data 110. The embodiments disclosed herein are not limited by the manner in which the data 110 is stored.

As shown in FIG. 1, the back-end system 106 is also configured to receive and respond to requests from other computing systems for the data 110. In the example shown in FIG. 1, for instance, the front-end system 104 has transmitted a request 114 to the back-end system 106 for the data 110. In response thereto, the back-end system 106 provides a reply to the request 114 that includes the requested data 110. In this regard, it should be appreciated that although only a single front-end system 104 has been illustrated in FIG. 1, the back-end system 106 might respond to requests 114 for the data from many other computing systems. Additionally, the illustration of the back-end system 106 in FIG. 1 has been simplified greatly for discussion purposes and may include many more software and hardware components, networking devices, networks, and other devices than shown in FIG. 1. Moreover, although the embodiments described herein are discussed primarily in the context of a back-end system 106, the embodiments described herein may be utilized with virtually any type of data source capable of receiving and responding to requests for data, such as the data 110.

As mentioned briefly above, the system illustrated in FIG. 1 also includes a front-end system 104 in one implementation. The front-end system 104 includes one or more computing systems configured to execute a page generation module 118 and a polling module 112. The polling module 112 is configured to periodically poll the back-end system 106 for the data 110. As discussed above, polling refers to a process of repeatedly requesting data from a data source, such as the back-end system 106, in order to obtain updated values for the data. For instance, in the example shown in FIG. 1, the polling module 112 may periodically transmit a request 114 to the back-end system 106 for the data 110. In response thereto, the back-end system 106 provides a reply that includes the requested data 110. The polling module 112 receives the requested data 110 and stores the data 110 in a cache 116 for consumption by other modules and/or systems, such as the page generation module 118. Although a cache 116 is shown in FIG. 1, the polling module 112 might utilize other mechanisms to store the data 110 for consumption by other systems, components, or modules.

The polling module 112 polls the back-end system 106 at a polling frequency 120 that may be specified by another component, such as the page generation module 118. If the polling frequency 120 is set too high, the back-end system 106 might have difficulty providing timely responses to the requests 114 transmitted by the front-end system 104. If the polling frequency 120 is set too low, the data 110 stored in the cache 116 may be stale (i.e. the data 110 stored in the cache 116 may be different than the data 110 stored in the data store 108). In order to address these, and potentially other problems, the embodiments disclosed herein provide a mechanism for dynamically adjusting the polling frequency 120 based upon the observed demand for the data 110. In this way, the frequency at which the polling module 112 polls the back-end system 106 for the data 110 can be adapted to, and optimized for, the actual demand for the data 110. Details regarding the operation of this mechanism are provided below.

As mentioned briefly above, the front-end system 104 is also configured in embodiments to execute a page generation module 118. The page generation module 118 is configured to receive requests, such as the page request 124 transmitted by the client device 102A, for a page 128 that includes the data 110. The page request 124 may be a hypertext transfer protocol ("HTTP") request for the page 128. Other types of requests for the page 128 might also be received and processed in the manner described herein.

In response to receiving such requests, the page generation module 118 is further configured to retrieve the data 110 stored in the cache 116 and to use the data 110 to generate the page 128. The page generation module 118 then provides a response 126 in response to the page request 124 that includes the generated page 128. For example, the page 128 might be a Web page configured to present the data 110 to a user of the client device 102A when rendered by a client application 122, such as a Web browser.

The page 128 might also be another type of page that can be rendered by a client application 122 and otherwise utilized in the manner described herein. In this regard, it should be appreciated that while the embodiments presented herein are primarily disclosed in the context of generating a page 128, such as a Web page, the embodiments presented herein might be utilized to provide the data 110 to the client device 102A through other types of resources. For example, and without limitation, a resource might include a Web page, a text page, an image, data delivered by way of an application executing on the client device 102A such as a console application, and a document such as word processing document or a spreadsheet document. The embodiments disclosed herein are not, therefore, limited to generating a page 128 as shown in the FIGURES and described below.

As also mentioned briefly above, the page generation module 118 is also configured to specify the polling frequency 120 used by the polling module 112. In one embodiment, for example, the page generation module 118 sets the polling frequency 120 to an initial frequency for use when no client devices 102 are utilizing the data 110. For example, and without limitation, the page generation module 118 might initially set the polling frequency 120 to zero or some relatively low frequency such as once per day or per hour. As mentioned briefly above, the initial polling frequency might be set on a per user, per customer, per resource, or other basis.

Once a page request 124 has been received for a page 128 that includes the data 110, the page generation module 118 might modify the polling frequency 120 to cause the polling module 112 to poll the back-end system 106 for the data 110 more frequently. For example, the polling frequency 120 might be set so that the polling module 112 polls the back-end system 106 for the data 110 every five minutes or other time period. In this way, the data 110 stored in the cache 116 can be updated more frequently following the receipt of a page request 124 for a page 128 that includes the data 110.

The page generation module 118 might also be configured to modify the polling frequency 120 based upon actual demand for the data 110 observed at the client device 102A. In order to enable this functionality, the page generation module 118 is further configured to include the status reporting code 130 in the page 128. The status reporting code 130 is program code that is executable by the client device 102A. For example, and without limitation, the status reporting code 130 might be JAVA or JAVASCRIPT code that is executable within a Web browser to perform the functionality described herein. Other types of program code that is executable on the client device 102A might also be utilized in other embodiments.

In one embodiment, the status reporting code 130 is configured to establish a persistent two-way communications channel 132 between the client device 102A and the front-end system 104. For example, and without limitation, the two-way communications channel 132 may be a WebSocket connection between the client device 102A and the front-end system 104. WebSocket is a protocol that can be utilized by clients and servers to enable the use of full-duplex communications channels over a single TCP connection. In order to provide this functionality, the WebSocket protocol provides a standardized way for a server, such as the front-end system 104, to send content to a client, such as the client device 102A, without being solicited by the client, and allows for messages to be passed back and forth while keeping the connection open. Using the WebSocket protocol, a two-way conversation can take place between the client application 122 and the page-generation module 118. Additional details regarding this conversation will be described below. It should be appreciated that other types of persistent two-way communications channels might be utilized between the client device 102A and the front-end system 104 in other embodiments.

It should be appreciated that although a two-way communications channel 132 is shown in FIG. 1 and described below, the embodiments presented herein are not limited to such an implementation. For example, and without limitation, AJAX may be utilized to submit RESTful requests including the status messages 134 to an appropriate API exposed by the page generation module 118 or another component. Server send events and other types of technologies might also be utilized to enable communication between the client device 102A and the front-end system 104 in other implementations. In this regard, it should be appreciated that the embodiments disclosed herein are not limited to the use of a two-way communications channel 132.

If a two-way communications channel 132 between the client device 102A and the front-end system 104 is utilized, the status reporting code 130 may utilize the communications channel 132 to transmit status messages 134 to the page generation module 118. The status messages 134 indicate the status of the display of the page 128 by the client application 122. For example, the status reporting code 130 may transmit a status message 134 to the page generation module 118 indicating that the page 128 is currently being displayed by the client application 122 (i.e. the page 128 is currently open and is in the foreground (i.e. the page is in "focus"). If the page 128 is currently being displayed, it may be desirable to update the data 110 contained therein more frequently. Consequently, the page generation module 118 might increase the polling frequency 120 in response to receiving a status message 134 indicating that the client application 122 is displaying the page 128.

The status reporting code 130 might also transmit a status message 134 to the page generation module 118 indicating that the page 128 is not currently being displayed by the client application 122 (i.e. the page 128 is currently open but is not in the foreground). This may occur, for example, if the page 128 is presented in one tab by the client application 122 and a user of the client device 102A selects another tab for display. If the page 128 is not currently being displayed, it may be possible and even desirable to update the data 110 contained therein less frequently. Consequently, the page generation module 118 might decrease the polling frequency 120 in response to receiving a status message 134 from the status reporting code 130 indicating that the client application 122 is not currently displaying the page 128.

The status reporting code 130 might also transmit a status message 134 to the page generation module 118 indicating that the page 128 has been closed. If the page 128 has been closed, the page generation module 118 might return the polling frequency 120 back to the frequency that was utilized before the page request 124 was received. In this way, the polling frequency 120 may be returned to zero or another infrequent period after a user has completed viewing the page 128. In some embodiments, the polling frequency 120 is reduced in this manner only if another user is not utilizing a page 128 that includes the data 110.

In some embodiments, the opening of another page related to the page 128 causes the polling frequency 120 to be modified. For example, and without limitation, the opening of a first page 128 may cause the polling frequency 120 to be set at a first rate. If another page is opened that also includes the data 110, the polling frequency 120 might be set to a second rate that is greater than the first rate.

In some embodiments, the status reporting code 130 is configured to determine whether a user is present and viewing the page 128 on the client device 102A. Various technologies may be utilized to determine whether a user is present at the client device 102A and/or whether or not the user is viewing the page 128 at the client device 102A. For example, a camera connected to the client device 102A may be utilized to determine if a user is present and, if so, whether the user is viewing the page 128. Other types of presence information might also be utilized to determine whether a user is viewing the page 128. For example, and without limitation, the movement of a mouse or other type of user input device while the page 128 is being displayed might signal that a user is viewing the page 128. Other types of technologies might also be utilized to determine whether a user is viewing the page 128.

In some embodiments, the status reporting code 130 is also configured to identify a particular portion of the page 128 that a user is currently looking at. Various technologies might also be utilized to determine the portion of the page 128 that the user is viewing. For example, and without limitation, eye-tracking technologies might be utilized to determine the portion of the page 128 that a user is currently looking at. Mouse cursor movement (e.g. "hovering" a mouse cursor over a portion of the page 128) and/or other types of user input might also be utilized as an indicator that a user is viewing a certain portion of the page 128. In some embodiments, only data 110 contained in the portion of the page 128 that a user is currently viewing or interacting with may be updated in the manner described herein. In other embodiments, a different polling frequency 120 might be utilized for data 110 presented in different areas on the page 128.

It should be appreciated that the status reporting code 130 might also transmit other types of messages to the page generation module 118 indicating other aspects of the status of the display of the page 128, other aspects of the status of the client application 122, and other aspects of the status of the client device 102A. The page generation module 118 might modify the polling frequency 120 based upon these other types of messages in a similar manner. In addition to or in place of the status messages 134, the reporting code 130 might also transmit messages to the page generation module 118 instructing the page generation module 118 to increase or decrease the polling frequency 120 in response to the occurrence of some or all of the events described above.

In some embodiments, the page generation module 118 also utilizes the two-way communications channel 132 or another communications mechanism in order to inform the client application 122 that the data 110 has changed. For example, the page generation module 118 might be configured to determine if the data 110 stored in the cache 116 has changed. In response to determining that the data 110 has changed, the page generation module 118 might transmit a message to the client application 122 indicating that new data 110 is available. For instance, in one embodiment, the page generation module 118 transmits a reload message 136 to the client application 122 instructing the client application 122 to obtain the updated data 110 by reloading the page 128 from the front-end system 104. In another embodiment, the page generation module 118 transmits the new data 110 directly to the client application 122 by way of the two-way communications channel 132 or using another communications mechanism. The display of the page 128 may then be refreshed in order to present the new data 110 to a user of the client device 102A. Other types of messages might also be transmitted to the client application 122 in order to cause the client application 122 to present the updated data 110.

The status reporting code 130 might also be configured to determine when the page 128 has been closed. In response thereto, the status reporting code 130 may close the two-way communications channel 132 with the front-end system 104. Additional details regarding the operation of the client device 102A, including the client application 122 and the status reporting code 130, will be provided below with regard to FIG. 2. Additional details regarding the operation of the front-end system 104, including the page generation module 118 and the polling module 112, are provided below with regard to FIG. 3.

It should be appreciated that the configuration shown in FIG. 1 is merely illustrative and that other configurations might be utilized to implement the functionality disclosed herein. In this regard, it should be appreciated that many more software and hardware components, networking components, networks, and other types of devices, components, modules, and systems may be utilized than shown in FIG. 1. Moreover, it should also be appreciated that the embodiments disclosed herein are not limited to any particular client-server architecture. For example, and without limitation, the client device shown in FIG. 1 might be a server computer in some embodiments. Moreover, and as discussed above, the embodiments disclosed herein are not limited to use with a two-way communications channel 132 or with a particular type of page 128.

Figure 2:
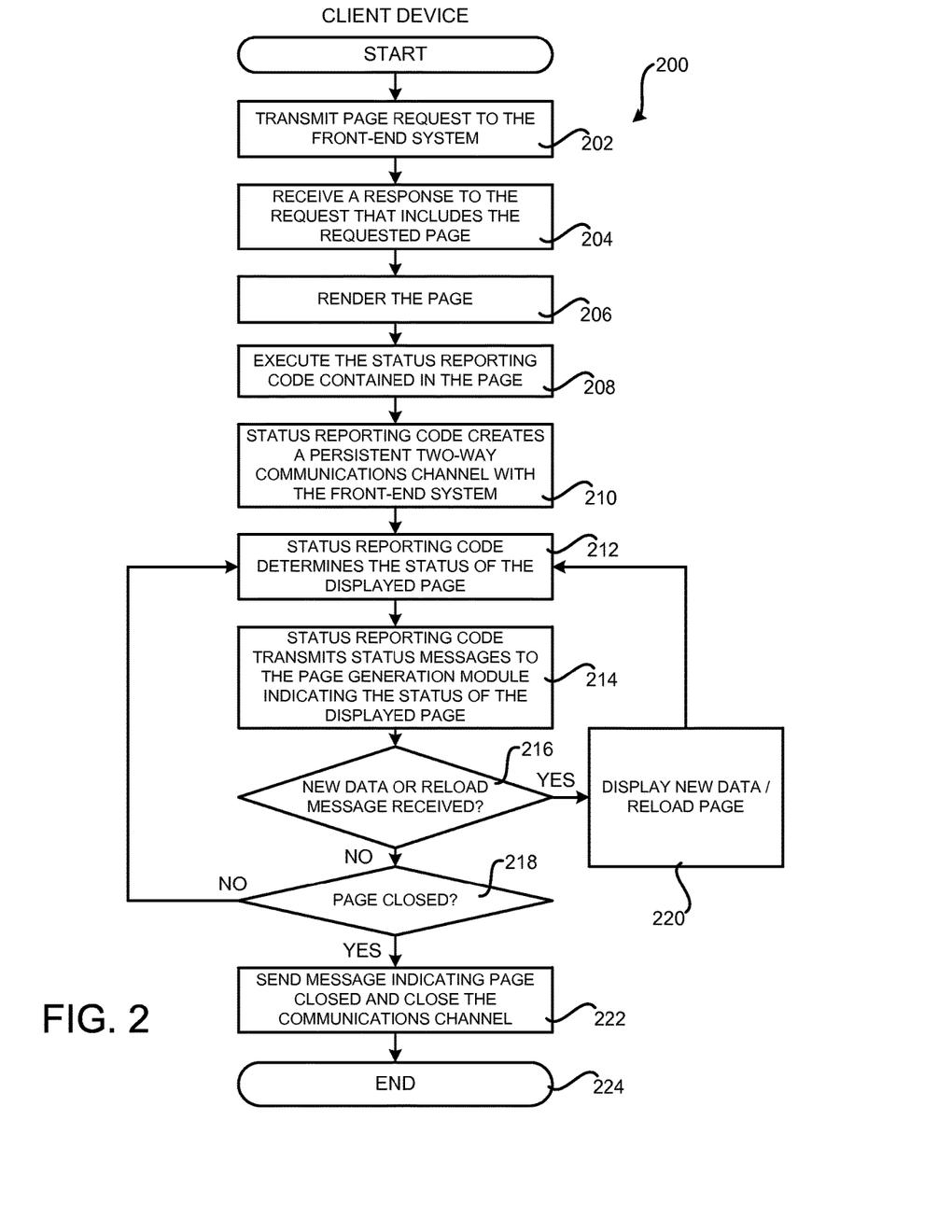
FIG. 2 is a flow diagram illustrating aspects of the operation of a client device in a mechanism presented herein for adaptive polling based upon demand.

FIG. 2 is a flow diagram showing a routine 200 that illustrates aspects of the operation of the client device 102A in one embodiment presented herein for adaptive polling based upon demand. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the client application 122 transmits a page request 124 to the page generation module 118 for a page 128 that includes the data 110. In response thereto, the page generation module 118 generates the page 128, including the data 110 retrieved from the cache 116, and provides the page 128 to the client application 122 at operation 204. As discussed above, other types of resources including the data 110 might also be generated and provided to the client device 102A in a similar manner. The routine 200 then proceeds from operation 204 to operation 206, where the client application 122 renders the page 128, including the presentation of the data 110. Rendering the page 128 also causes the client application 122 to execute the status reporting code 130 contained in the page 128. This occurs at operation 208.

From operation 208, the routine 200 proceeds to operation 210, where the status reporting code 130 establishes the two-way communications channel 132 between the client device 102A and the page generation module 118 in one embodiment. As mentioned above, the two-way communications channel 132 is a WebSocket connection in one embodiment, however other types of persistent two-way communications channels might also be utilized. As also mentioned above, other technologies might also be utilized in other embodiments for enabling communication between the client device 102A and the front-end system 104 that do not utilize a two-way communications channel 134.

Once the two-way communications channel has been established in one embodiment, the routine 200 proceeds to operation 212. At operation 212, the status reporting code 130 determines the status of the display of the page 128 on the client device 102A. For example, and without limitation, the status reporting code 130 may determine whether the page 128 is currently being displayed, is not currently being displayed, whether the page 128 has been closed, or another status. As discussed above, the status reporting code 130 might also determine whether a user is present at the client device 102A and/or whether the user is viewing the page 128. The status reporting code 130 might also identify a particular portion of the page 128 that the user is viewing.

From operation 212, the routine 200 then proceeds to operation 214, where the status reporting code 130 transmits one or more status messages 134 over the two-way communications channel 132 or using another mechanism to the page generation module 118. As mentioned above, the status messages 134 indicate the current status of the display of the page 128 on the client device 102A, such as whether the page is being displayed, whether a user is present, whether the user is viewing the page 128, and/or the portion of the page 128 that the user is viewing. As also mentioned above, the page generation module 118 may modify the polling frequency 120 based on the content of the status messages 134. The status messages 134 might also instruct the page generation module 118 to increase or decrease the polling frequency 120. Details regarding this process will be provided below with regard to FIG. 3.

From operation 214, the routine 200 proceeds to operation 216, where the status reporting code 130 determines whether a message has been received from the page generation module 118 indicating that new data 110 is available. For example, the status reporting code 130 might receive a reload message 110 instructing the status reporting code 130 to reload the page 128 to obtain new data 110. Alternately, the status reporting code 130 might receive the new data 110. In either case, the routine 200 proceeds from operation 216 to operation 220, where the status reporting code 130 reloads the page 128 and/or refreshes the display of the page 128 in order to present the new data 110. The routine 200 then proceeds from operation 220 to operation 212, which was described above.

If, at operation 216, the status reporting code 130 determines that a message was not received from the page generation module 118 indicating that new data 110 is available, the routine 200 proceeds from operation 216 to operation 218. At operation 218, the status reporting code 130 determines if the page 128 has been closed. If the page 128 has not been closed, the routine 200 returns to operation 212, described above, where the status reporting code 130 may continue to transmit status messages 134 to the page generation module 118 in the manner described above.

If, at operation 218, the status reporting code 130 determines that the page 128 has been closed, the status reporting code 130 transmits a message to the page generation module 118 indicating that the page 128 has been closed. As discussed above, the page generation module 118 may reduce the polling frequency 120 in response to receiving such a message 134. The status reporting code 130 may also close the two-way communications channel 132 with the page generation module 118 in embodiments where such a communications channel is utilized. From operation 222, the routine 200 proceeds to operation 224, where it ends.

Figure 3A:
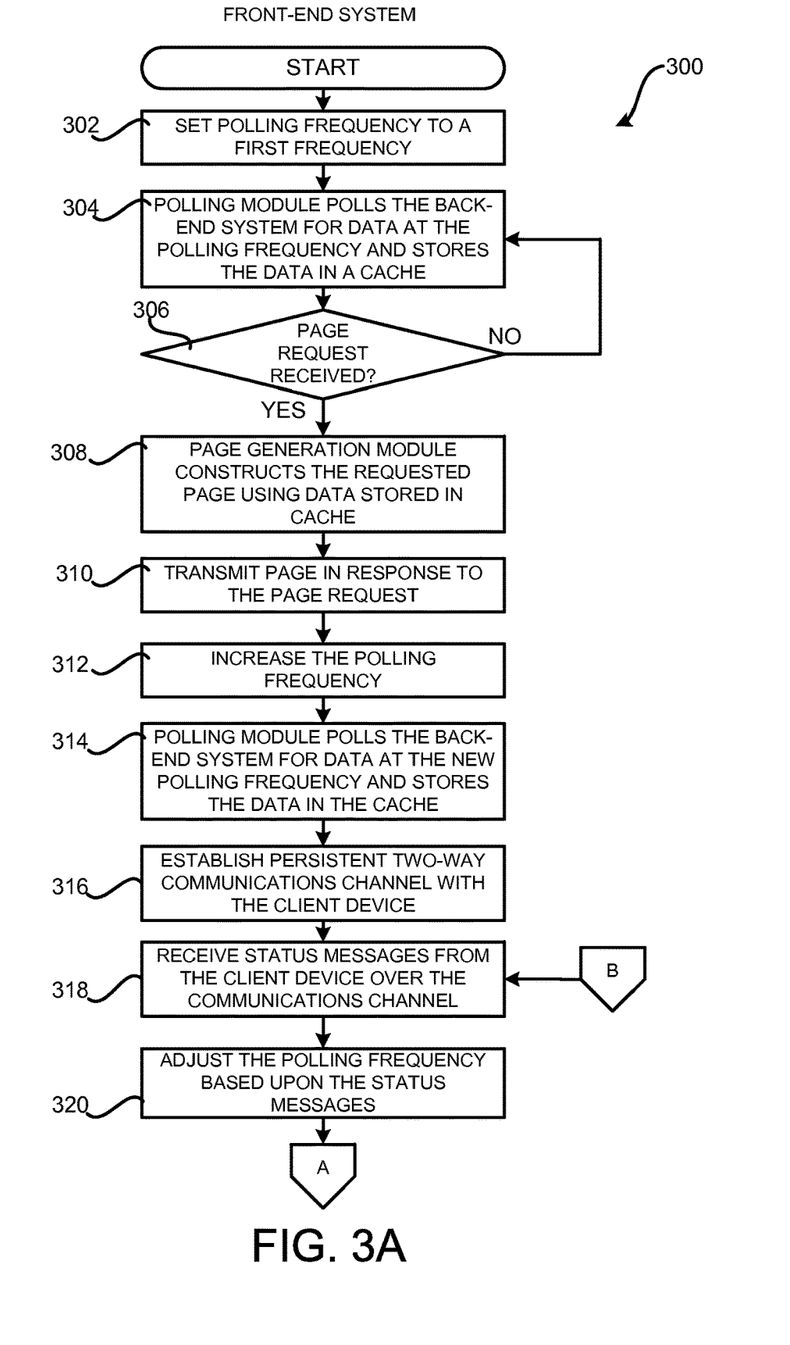
FIGS. 3A and 3B are flow diagrams illustrating aspects of the operation of a front-end system in a mechanism disclosed herein for adaptive polling based upon demand.
Figure 3B:
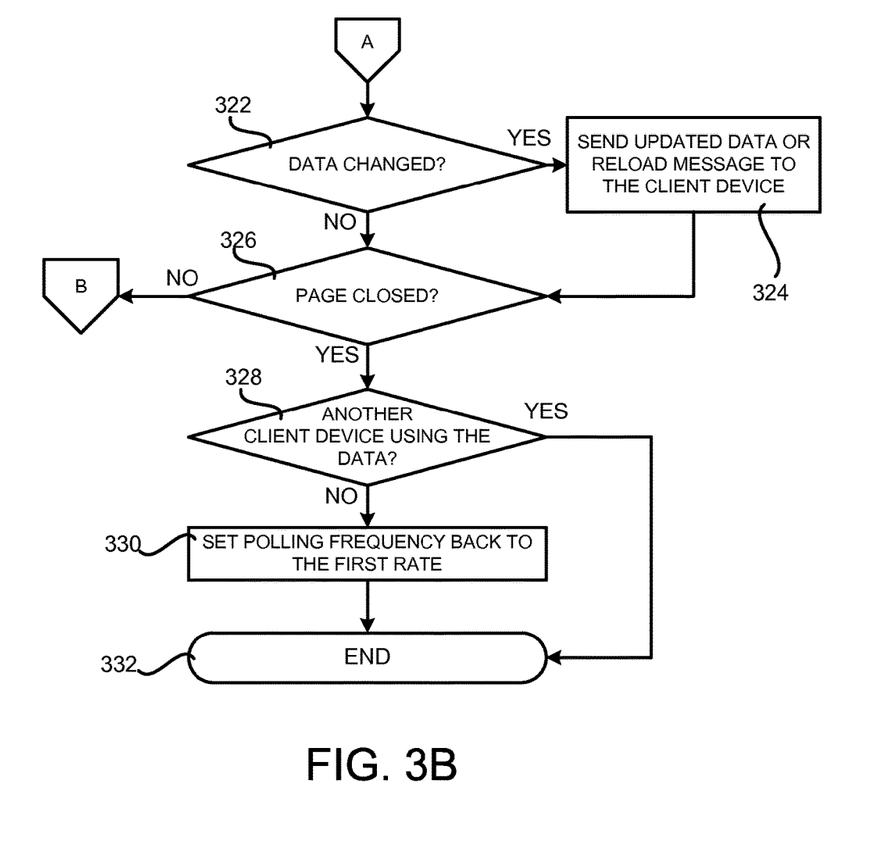

FIGS. 3A and 3B are flow diagrams showing a routine 300 that illustrates aspects of the operation of a front-end system 104 in a mechanism disclosed herein for adaptive polling based upon demand. The routine 300 begins at operation 302, where the page generation module 118 sets the polling frequency 120 to an initial frequency. As discussed above, the initial frequency might be zero or a relatively low frequency, such as once per hour or day. The routine 300 then proceeds from operation 302 to operation 304.

At operation 304, the polling module 112 polls the back-end system 106 for the data 110 at the polling frequency 120. The polling module 112 stores the data 110 retrieved from the back-end system 106 in the cache 116 in the manner described above. From operation 304, the routine 300 proceeds to operation 306.

At operation 306, the page generation module 118 determines whether a page request 124 has been received for a page 128 that includes the data 110. If such a page request 124 has not been received, the routine 300 proceeds back to operation 304, described above, where the polling module 112 may continue to poll the back-end system 106 for the data 110 at the initial polling frequency 120. If, however, the page generation module 118 determines that a page request 124 has been received for a page 128 that includes the data 110, the routine 300 proceeds from operation 306 to operation 308.

At operation 308, the page generation module 118 constructs the requested page 128 using the data 110 stored in the cache 116. As also mentioned above, the page generation module 118 also inserts the status reporting code 130 in the generated page 128. The page generation module 118 transmits the page 128 to the client application 122 at operation 310. The routine 300 then proceeds from operation 310 to operation 312.

At operation 312, the page generation module 118 increases the polling frequency 120. For example, the page generation module 118 might increase the polling frequency 120 such that the polling module 112 begins polling for the data 110 every five minutes or every one minute. The polling module 112 begins polling the back-end system 106 with the new polling frequency 120 at operation 120. As described above, the polling module 112 continues to store the data 110 received from the back-end system 106 in the cache 116.

From operation 314, the routine 300 proceeds to operation 316, where the two-way communications channel 132 may be established with the client device 102A in embodiments where such a communications channel is utilized. As mentioned above, the status reporting code 130 in the page 128 provided to the client application 122 may initiate the establishment of the two-way communications channel 132. Other mechanisms might also be utilized to enable communications between the front-end system 104 and the client device 102A in other embodiments. Once the two-way communications channel 132 has been established, the routine 300 proceeds to operation 318, where the page generation module 118 receives the status messages 134 from the status reporting code 130 by way of the two-way communications channel 132.

The routine 300 then proceeds from operation 318 to operation 320, where the polling module 112 adjusts the polling frequency 120 based upon the status messages 134 received from the status reporting code 130. For example, and as discussed above, the page generation module 118 might increase the polling frequency 120 in response to receiving a status message 134 from the status reporting code 130 indicating that the client application 122 is currently displaying the page 128 or that a user is currently viewing the page 128 or a portion of the page 128. The page generation module 118 also might decrease the polling frequency 120 in response to receiving a status message 134 from the status reporting code 130 indicating that the client application 122 is not currently displaying the page 128 or that a user is present but not currently viewing the page 128.

From operation 320, the routine 300 proceeds to operation 322 (shown in FIG. 3B), where the page generation module 118 determines whether the data 110 has changed. If the data 110 has changed, the routine 300 proceeds from operation 322 to operation 324, where the page generation module 118 provides a message to the status reporting code 130 indicating that new data is available. For example, and without limitation, the page generation module 118 might provide a reload message 136 to the status reporting code 130 instructing the client application 122 to reload the page 128 in order to receive the new data 110. Alternately, the page generation module 118 might provide the new data 110 directly to the page 128 by way of the two-way communications channel 132 or using another communications mechanism. From operation 324, the routine 300 proceeds to operation 326.

If new data 110 is not available at operation 322, the routine 300 proceeds to operation 326, where the page generation module 118 determines whether a status message 134 was received from the status reporting code 130 indicating that the page 128 has been closed. If the page 128 has not been closed, the routine 300 proceeds back to operation 318, described above, where status messages 134 may continue to be received and the polling frequency 120 modified based upon the received status messages 134. If the page 128 has been closed, the routine 300 proceeds from operation 326 to operation 328.

At operation 328, the page generation module 118 determines if another client device 102A has a page 128 including the data 110 open. If no other client device 102A has a page 128 open that includes the data 110, the routine 300 proceeds to operation 330, where the page generation module 118 sets the polling frequency 120 back to the frequency at which it was set at operation 302. In this way, the polling frequency 120 can be reset to zero or another relatively low frequency when the demand for the data 110 has subsided. If another client device 102A is utilizing the data 110, the routine 300 proceeds from operation 328 to operation 332 without resetting the polling frequency 120 to its initial value. In this way, polling will continue at the increased frequency until no client devices 102 are utilizing the data 110. The routine 300 ends at operation 332.

It should be appreciated that, in some embodiments, machine learning or other techniques might be utilized to identify historical patterns regarding the manner in which the data 110 is requested by the client devices 102. This historical data might be utilized to influence the manner in which the polling frequency 120 is modified in the manner described above. For example, and without limitation, the polling frequency 120 might not be returned to its initial value even though no client device 120 is currently using the data 110 if historical patterns indicate that a request for the data 110 is likely to be incoming within a short period of time. Historical patterns regarding the manner in which the data 110 is requested by the client devices 102 might also be utilized to influence the polling frequency 120 in other ways in other embodiments.

Figure 4:
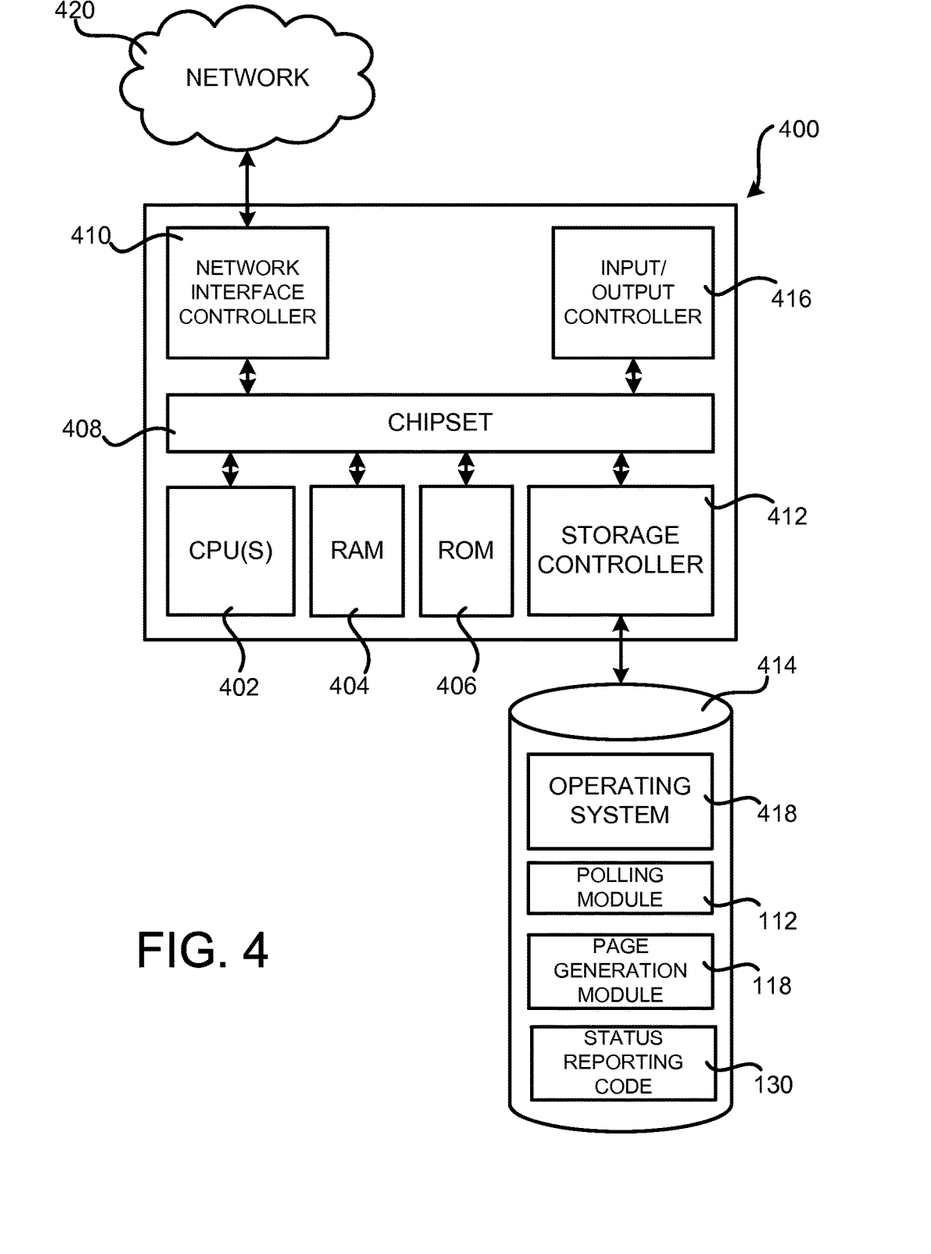
FIG. 4 is a computer architecture diagram showing an illustrative computer hardware architecture for computing devices described in embodiments presented herein.

FIG. 4 shows an example computer architecture for a computer 400 capable of executing the software components described herein. The computer architecture shown in FIG. 4 illustrates a conventional server computer, workstation, desktop computer, laptop, network appliance, personal digital assistant ("PDA"), electronic book reader, digital cellular phone, or other computing device, and may be utilized to execute any aspects of the software components presented herein. For example, and without limitation, the computer architecture shown in FIG. 4 might be utilized to implement computer systems that execute software components for implementing the functionality provided by the client devices 102, the front-end system 104, and the back-end system 106.

The computer 400 includes a baseboard, or "motherboard," which is a printed circuit board to which a multitude of components or devices may be connected by way of a system bus or other electrical communication paths. In one illustrative embodiment, one or more central processing units ("CPUs") 402 operate in conjunction with a chipset 408. The CPUs 402 are standard programmable processors that perform arithmetic and logical operations necessary for the operation of the computer 400.

The CPUs 402 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 408 provides an interface between the CPUs 402 and other components and devices on the baseboard. For instance, the chipset 408 may provide an interface to a random access memory ("RAM") 404, used as the main memory in the computer 400. The chipset 408 may further provide an interface to a computer-readable storage medium such as a read-only memory ("ROM") 406 or non-volatile RAM ("NVRAM") for storing basic routines that help to startup the computer 400 and to transfer information between the various components and devices. The ROM 406 or NVRAM may also store other software components necessary for the operation of the computer 400 in accordance with the embodiments described herein.

According to various embodiments, the computer 400 may operate in a networked environment using logical connections to remote computing devices and computer systems through the network 420, such as a local-area network ("LAN"), a wide-area network ("WAN"), the Internet, or any other networking topology known in the art that connects the computer 400 to remote computers. The chipset 408 includes functionality for providing network connectivity through a network interface controller ("NIC") 410, such as a gigabit Ethernet adapter. The NIC 410 is capable of connecting the computer 400 to other computing devices over the network 420. It should be appreciated that any number of NICs 410 may be present in the computer 400, connecting the computer 400 to various types of networks and remote computer systems.

The computer 400 may be connected to a mass storage device 414 that provides non-volatile storage for the computer 400. The mass storage device 414 may store system programs, application programs, other program modules, and data, which are described in greater detail herein. The mass storage device 414 may be connected to the computer 400 through a storage controller 412 connected to the chipset 408. The mass storage device 414 may consist of one or more physical storage units. The storage controller 412 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 400 may store data on the mass storage device 414 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 414 is characterized as primary or secondary storage, and the like. For example, the computer 400 may store information to the mass storage device 414 by issuing instructions through the storage controller 412 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the mass storage device 414 by detecting the physical states or characteristics of one or more particular locations within the physical storage units.

In addition to the mass storage device 414 described above, the computer 400 may have access to other computer-readable storage media to store and retrieve information, such as program modules, data structures, or other data. It should be appreciated by those skilled in the art that computer-readable storage media can be any available non-transitory media that may be accessed by the computer 400. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 414 may store an operating system 418 utilized to control the operation of the computer 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 414 may store other system or application programs and data utilized by the computer 400, such as the polling module 112, the page generation module 118, and/or the status reporting code 130, each of which was described above in regard to FIGS. 1-3.

In one embodiment, the mass storage device 414 or other computer-readable storage media may be encoded with computer-executable instructions that, when loaded into the computer 400, may transform the computer from a general-purpose computing system into a special-purpose computer capable of implementing the embodiments described herein. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routines 200 and 300 described above with regard to FIGS. 2 and 3, respectively.

The computer 400 might also include an input/output controller 416 for receiving and processing input from a number of input devices, such as a keyboard, a mouse, a touchpad, a touch screen, an electronic stylus, or other type of input device. Similarly, the input/output controller 416 may provide output to a display, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that various concepts and technologies for adaptive polling based upon demand have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:
1. An apparatus for adaptive polling based upon demand, the apparatus comprising:
   a processor; and
   a computer-readable storage medium having computer-executable instructions stored thereupon which, when executed by the processor, cause the apparatus to:
      poll a data source for data at a first polling frequency,
      receive a request from a client device for a page comprising the data, in response to receiving the request from the client device:
         generate the page comprising the data and a status reporting code, the page being configured such that:
            the status reporting code is executed by the client device at least partly in response to rendering the page on the client device, and
            executing the status reporting code establishes a communications channel between the apparatus and the client device,
      send the page to the client device, and
      poll the data source for the data at a second polling frequency greater than the first polling frequency, receive a status message from the status reporting code executed by the client device and via the communications channel, the status message indicating that the page is open on the client device and that a portion of the data is displayed in a foreground on a display of the client device, and in response to receiving the status message indicating that the page is open and that at least the portion of the data is displayed in the foreground on the display of the client device, modify the second polling frequency.

2. The apparatus of claim 1, wherein the computer-readable storage medium has further computer-executable instructions stored thereupon which, when executed by the processor, cause the apparatus to: determine, based upon the polling, whether the data has changed; and provide a message to the client device indicating that new data is available in response to determining that the data has changed.

3. The apparatus of claim 2, wherein the message indicating that the new data is available comprises a message instructing the client device to update at least a portion of the page.

4. The apparatus of claim 1, wherein the computer-readable storage medium has further computer-executable instructions stored thereupon which, when executed by the processor, cause the apparatus to: determine that an additional client device is rendering an additional page that includes the data; and continue polling the data source for the data at the second polling frequency based at least in part on determining that the additional client device is rendering the additional page.

5. The apparatus of claim 1, wherein modifying the second polling frequency comprises increasing the second polling frequency.

6. The apparatus of claim 1, wherein generating the page includes retrieving the data from a cache, using the data to construct the page, and adding the status reporting code to the page.

7. The system of claim 1, wherein the computer-readable storage medium has further computer-executable instructions stored thereupon which, when executed by the processor, cause the apparatus to poll the data source for the data at the first polling frequency in response to receiving a second status message from the client device, the second status message indicating that the page has been closed on the client device.

8. The apparatus of claim 1, wherein the status reporting code is configured to identify a particular portion of the page that a user of the client device is interacting with, the computer-executable instructions causing the apparatus to: poll for particular data contained in the particular portion of the page at the second polling frequency and poll for additional data contained outside of the particular portion of the page at a third polling frequency that is less than the second polling frequency.

9. The apparatus of claim 1, wherein the computer-executable instructions cause the apparatus to: identify a historical pattern associated with requests for the data by the client device; and modify the second polling frequency based at least in part on the historical pattern.

10. A computer-readable storage medium having computer-executable instructions stored thereon which, when executed by a computer, cause the computer to:

request data from a remote computing system;

receive, at least partly in response to requesting the data, a page generated by the remote computing system, the page comprising the data and a status reporting code;

render the page, wherein rendering the page causes the computer to:

display the data received from the remote computing system, and execute the status reporting code included in the page;

establish a communications channel between the computer and the remote computing system at least partly in response to executing the status reporting code;

determine a status of the display of the page;

transmit one or more status messages with the status reporting code and via the communications channel, a status message of the one or more status messages indicating that the page is open on the computer and identifying a particular portion of the page that is displayed in a foreground on a display associated with the computer;

receive a message from the remote computing system, via the communications channel, indicating that new data associated with the particular portion of the page is available from the remote computing system; and in response to receiving the message: obtain the new data from the remote computing system via the communications channel, and cause the new data to be displayed.

11. The computer-readable storage medium of claim 10, wherein the communications channel comprises a persistent two-way communications channel for use in transmitting the one or more status messages to the computing system.

12. The computer-readable storage medium of claim 10, wherein the message indicating that new data is available from the remote computing system comprises an instruction to reload the data, and wherein causing the new data to be displayed comprises reloading the data from the remote computing system in response to receiving the message from the remote computing system.

13. The computer-readable storage medium of claim 10, wherein the message indicating that the new data is available comprises the new data.

14. The computer-readable storage medium of claim 10, the computer-executable instructions further causing the computer to: cause first data contained within the particular portion of the page to be updated with the new data without causing second data contained within another displayed portion of the page to be updated.

15. A computer-implemented method for adaptive polling based upon demand, the method comprising:

polling a data source for data at a first polling frequency;

receiving a request from a client device for a page comprising the data;

generating, in response to receiving the request, the page comprising the data and a status reporting code;

sending the page to the client device, the page being configured such that:

the status reporting code is executed by the client device at least partly in response to rendering the page on the client device, and executing the status reporting code included in the page, by the client device, establishes a communications channel with the client device;

polling the data source for the data at a second polling frequency greater than the first polling frequency;

receiving a status message from the status reporting code executed by the client device and via the communications channel, the status message indicating that the page is open on the client device and identifying a particular portion of the page that is displayed in a foreground on a display associated with the client device; and in response to receiving the status message identifying the particular portion of the page, modifying the second polling frequency.

16. The computer-implemented method of claim 15, wherein the communications channel comprises a WebSocket connection, and wherein the status message is received from the client device via the WebSocket connection.

17. The computer-implemented method of claim 15, wherein modifying the polling frequency includes polling data associated with the particular portion of the page at a third polling frequency greater than the second polling frequency.

18. The computer-implemented method of claim 15, wherein generating the page includes retrieving the data from a cache, using the data to construct the page, and adding the status reporting code to the page.

19. The computer-implemented method of claim 15, further comprising generating a message indicating that new data is available and instructing the client device to update at least a portion of the page; and transmitting the message to the client device via the communications channel.

20. The apparatus of claim 15 wherein the communications channel comprises a persistent two-way communications channel for use in transmitting the status message.

* * * * *